Dec. 8, 1942.   H. T. AVERY   2,304,329
CALCULATING MACHINE
Original Filed June 12, 1936   12 Sheets-Sheet 1
FIG_1_
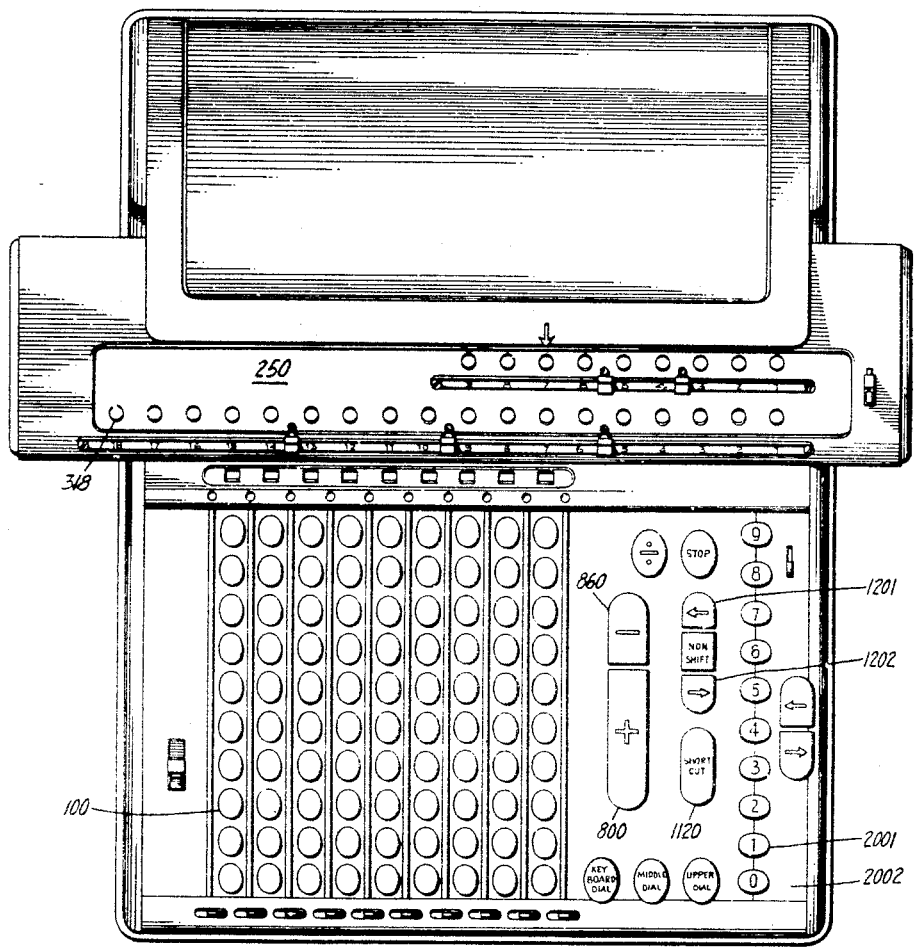
Inventor
HAROLD T. AVERY
By
Attorney

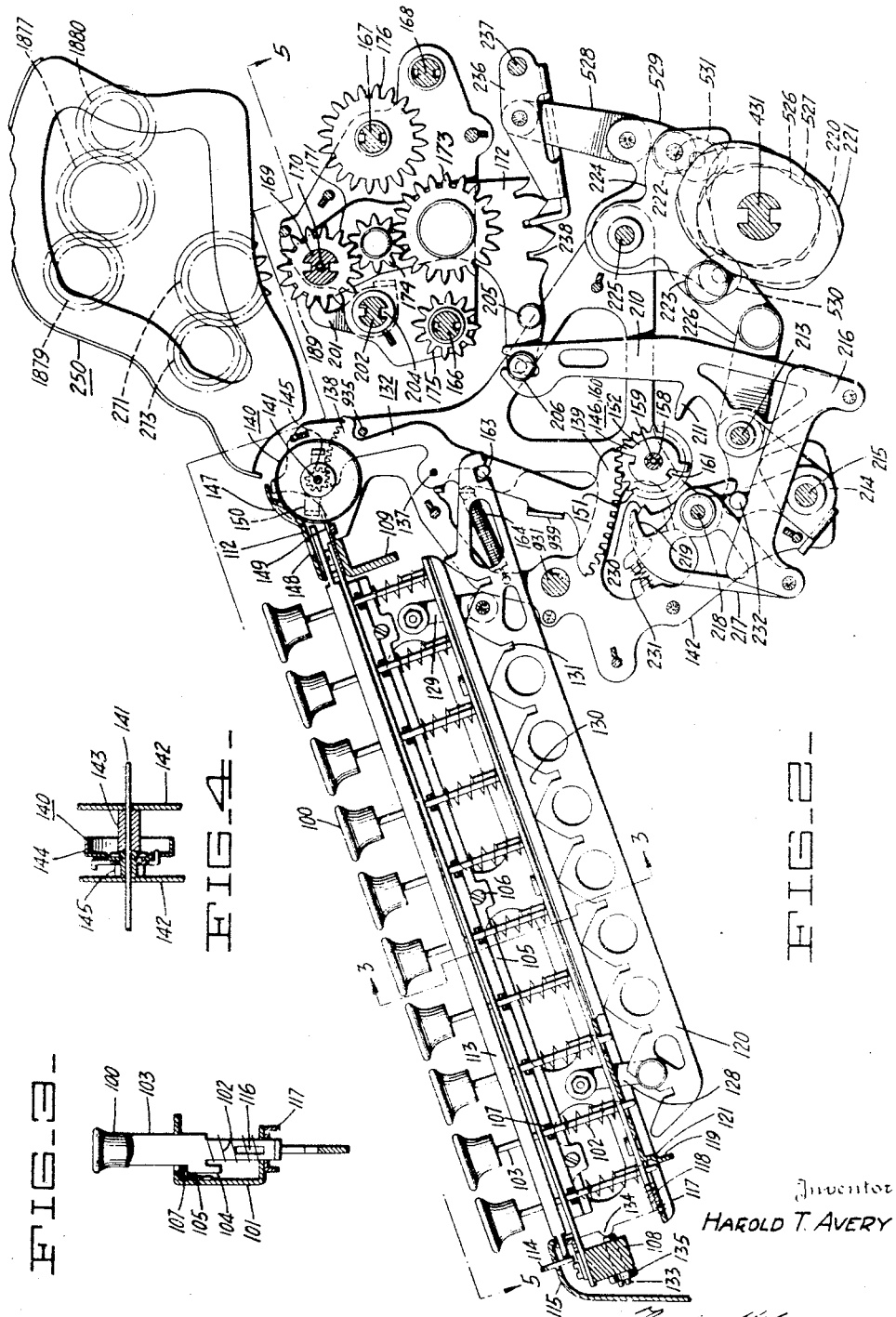

Dec. 8, 1942. H. T. AVERY 2,304,329
CALCULATING MACHINE
Original Filed June 12, 1936 12 Sheets-Sheet 3

Inventor
HAROLD T. AVERY

Attorney

Dec. 8, 1942.   H. T. AVERY   2,304,329
CALCULATING MACHINE
Original Filed June 12, 1936   12 Sheets-Sheet 4
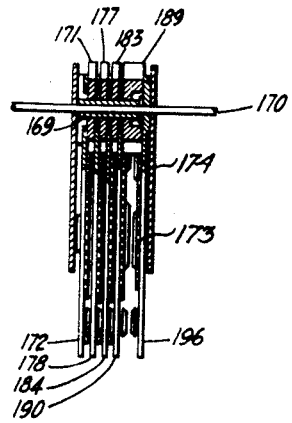
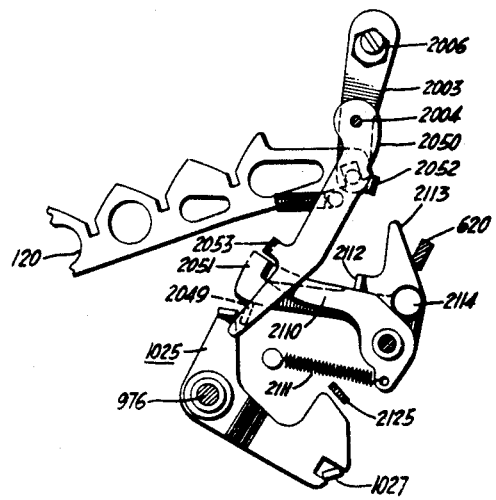
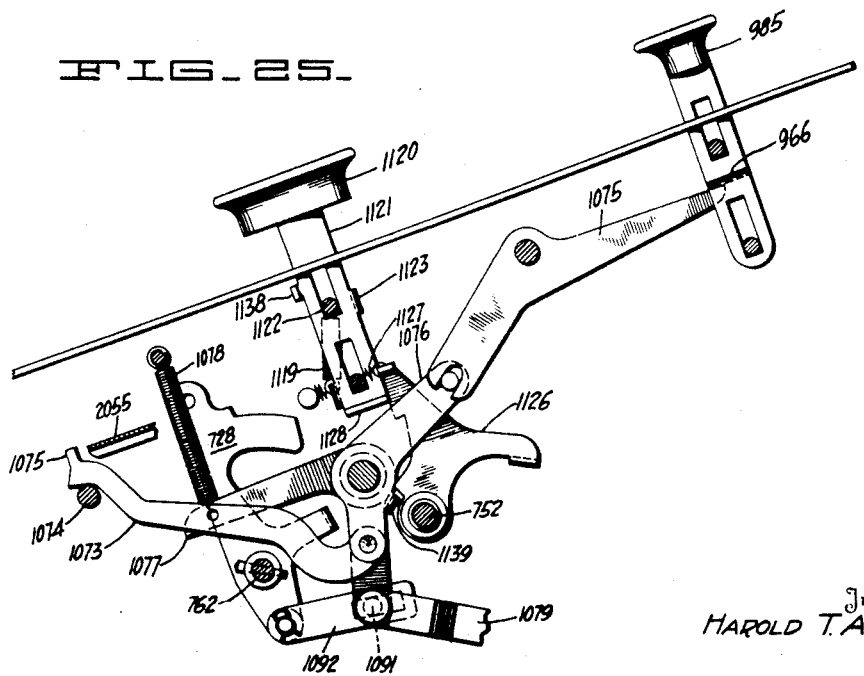
Inventor
HAROLD T. AVERY
Attorney Dec. 8, 1942. H. T. AVERY 2,304,329
CALCULATING MACHINE
Original Filed June 12, 1936 12 Sheets-Sheet 5
FIG_7
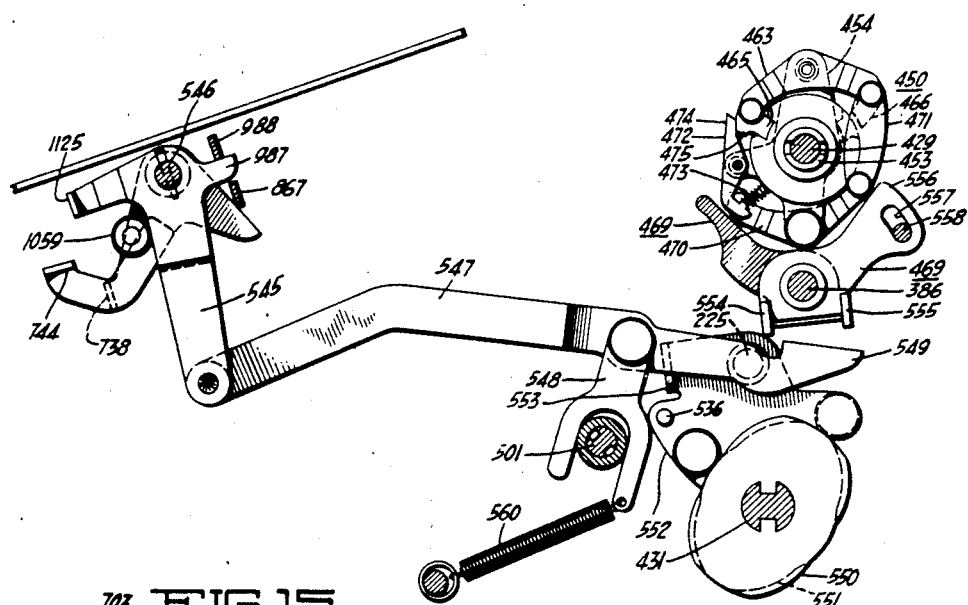
FIG_15
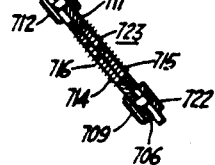
FIG_14
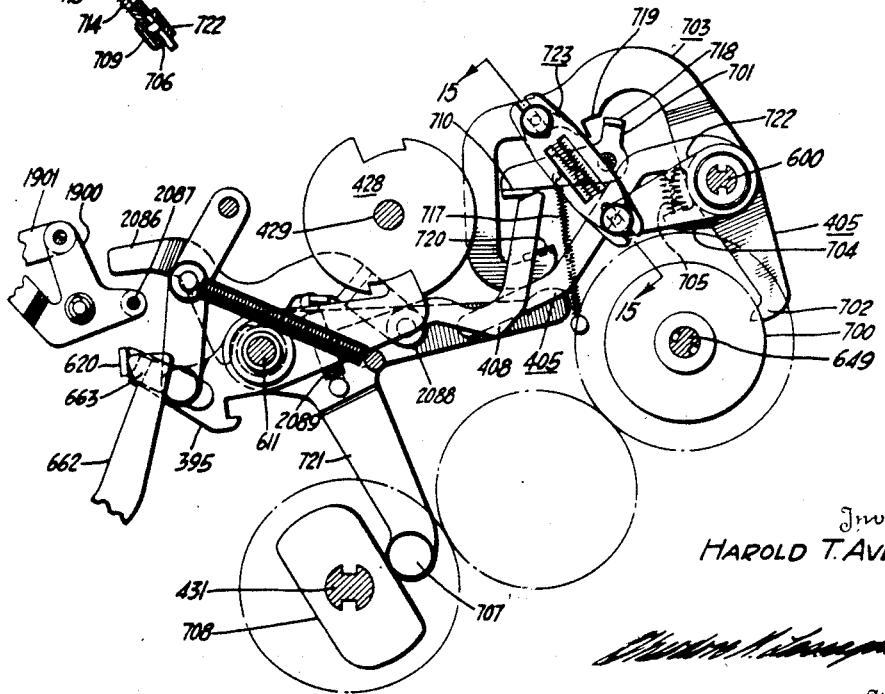
Inventor
HAROLD T. AVERY
Attorney Dec. 8, 1942. H. T. AVERY 2,304,329
CALCULATING MACHINE
Original Filed June 12, 1936 12 Sheets-Sheet 6
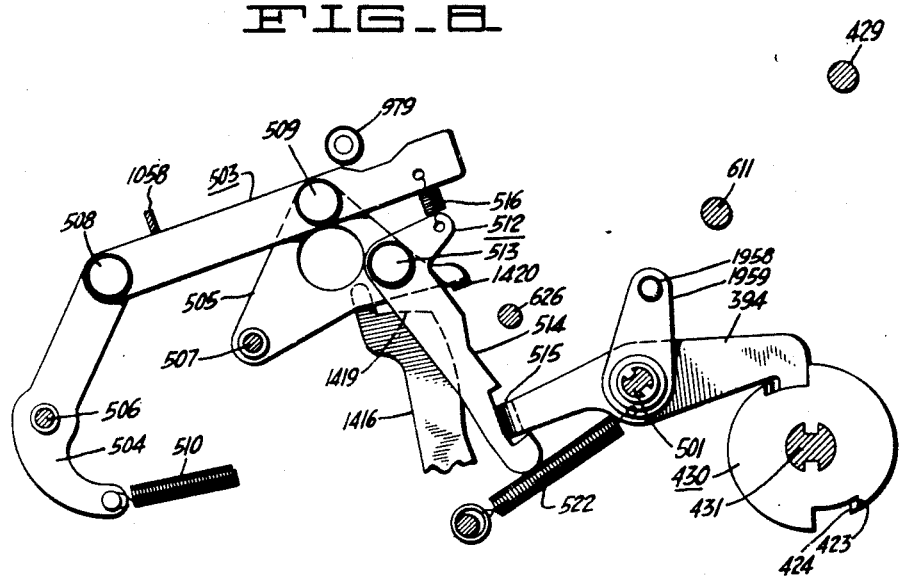
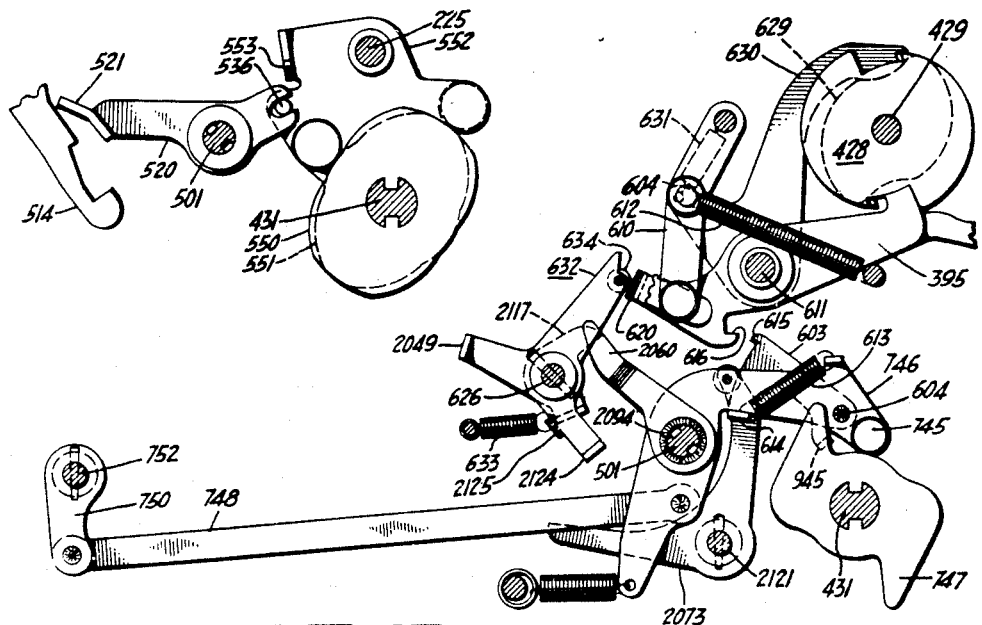
Inventor
HAROLD T. AVERY
By
Attorney Dec. 8, 1942.  H. T. AVERY  2,304,329
CALCULATING MACHINE
Original Filed June 12, 1936  12 Sheets-Sheet 7
FIG_11.
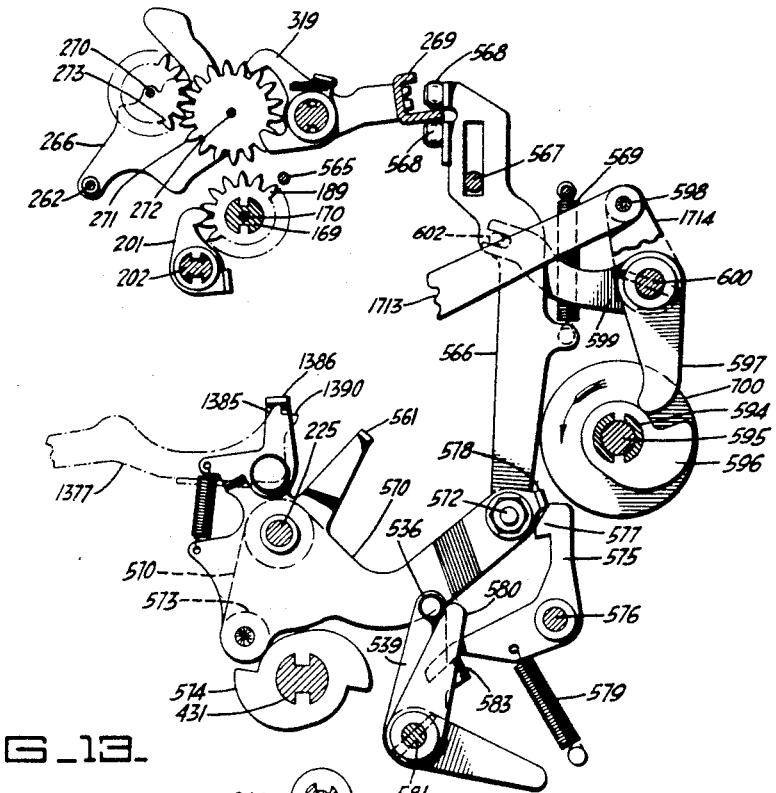
FIG_13.
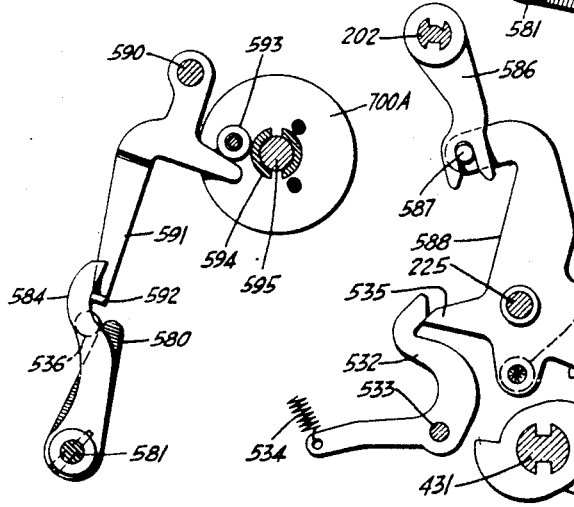
FIG_12.
Inventor
HAROLD T. AVERY
By [signature]
Attorney Dec. 8, 1942. H. T. AVERY 2,304,329
CALCULATING MACHINE
Original Filed June 12, 1936 12 Sheets-Sheet 8
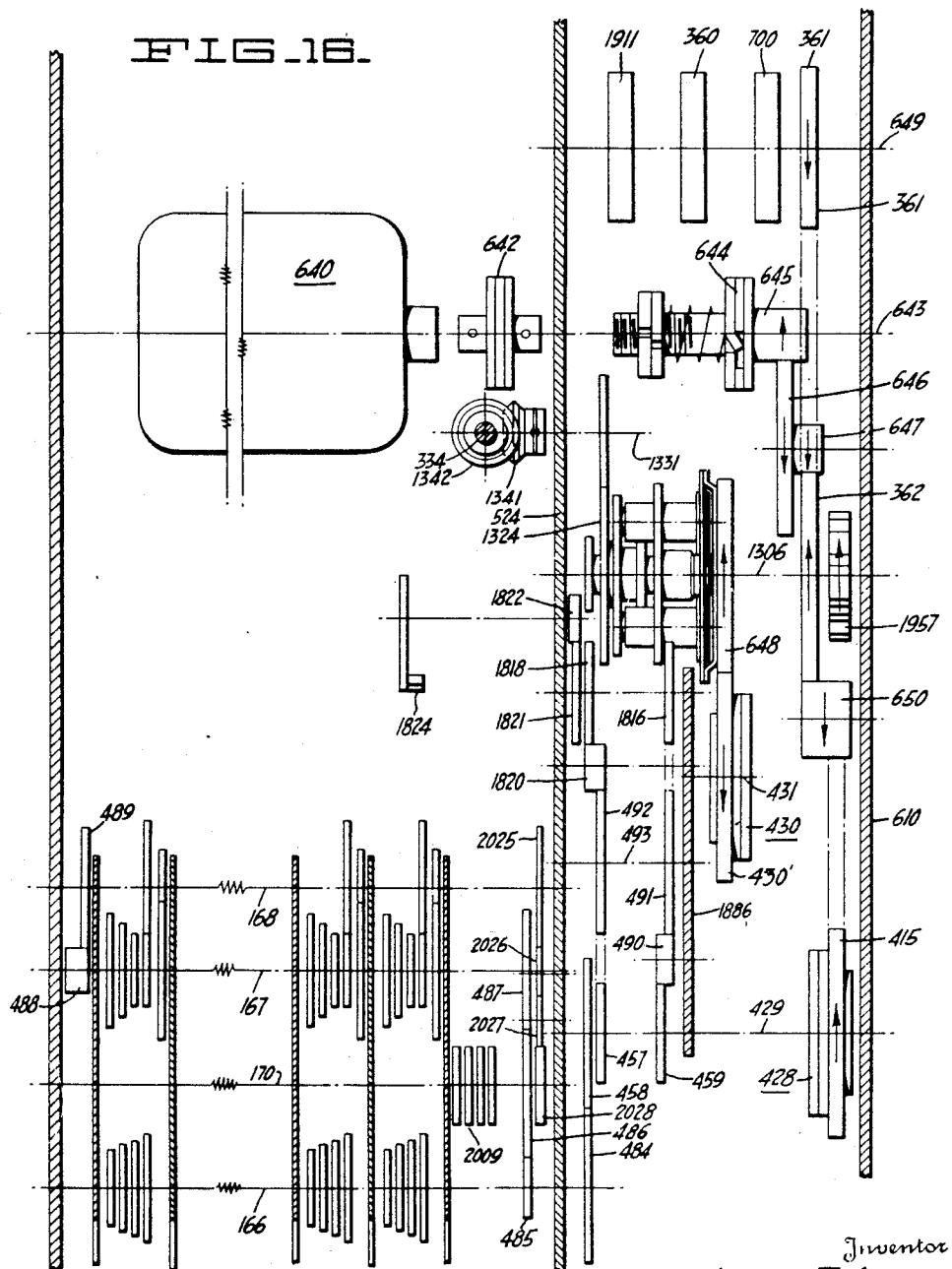

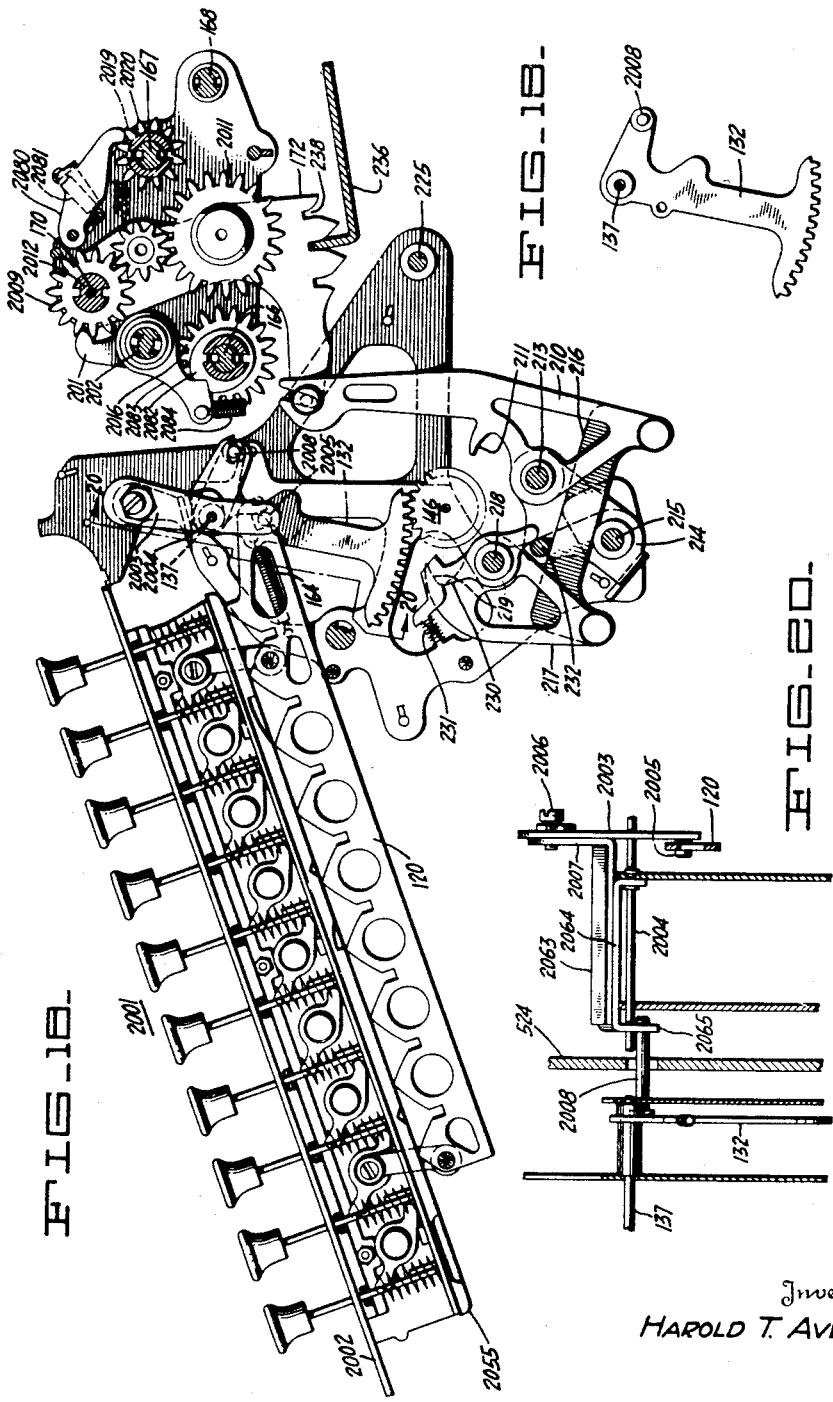

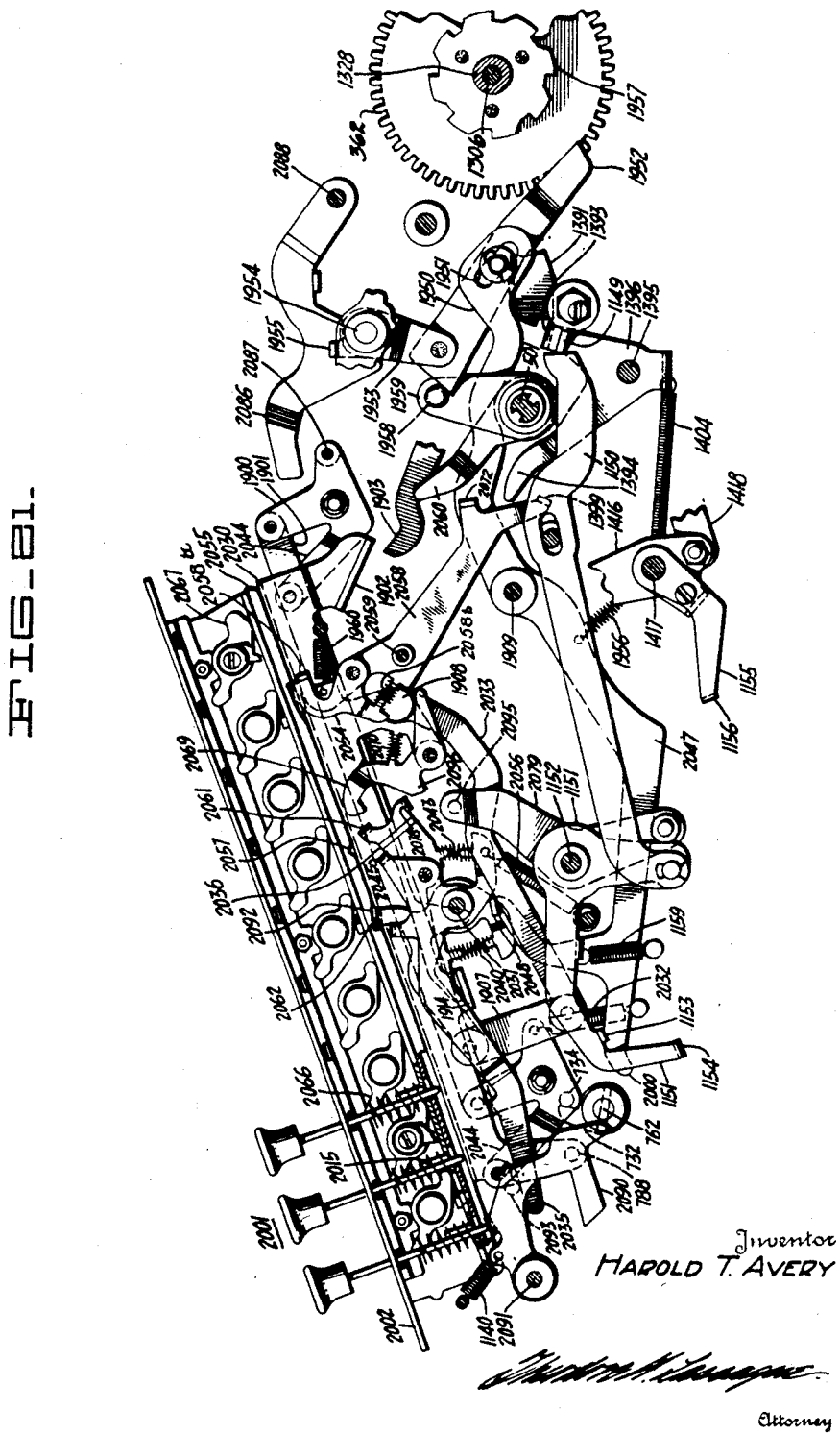

Dec. 8, 1942.                H. T. AVERY                2,304,329
                        CALCULATING MACHINE
            Original Filed June 12, 1936    12 Sheets-Sheet 11
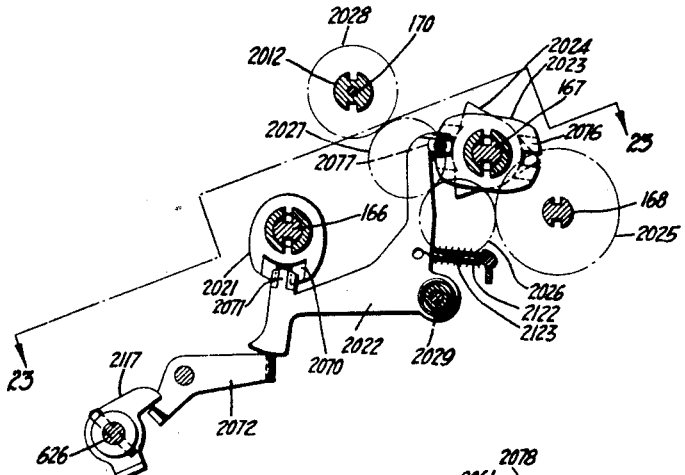
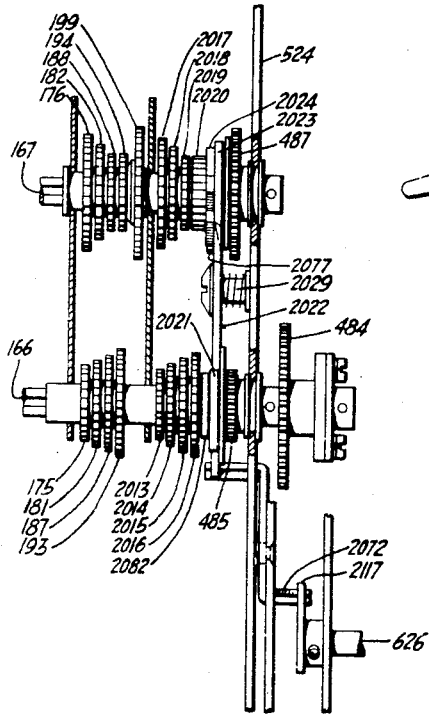
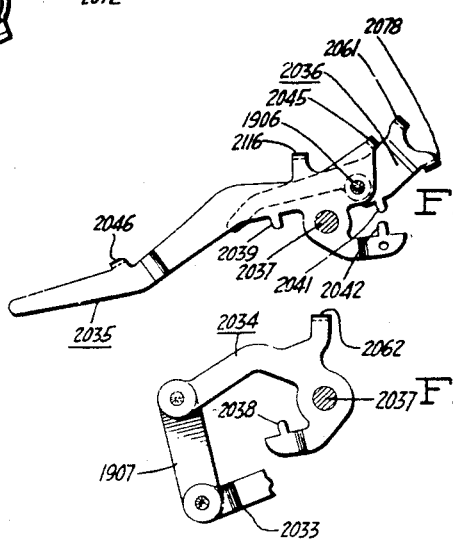
Inventor
HAROLD T. AVERY
By
                    Attorney Dec. 8, 1942.   H. T. AVERY   2,304,329
CALCULATING MACHINE
Original Filed June 12, 1936   12 Sheets-Sheet 12
FIG_26.
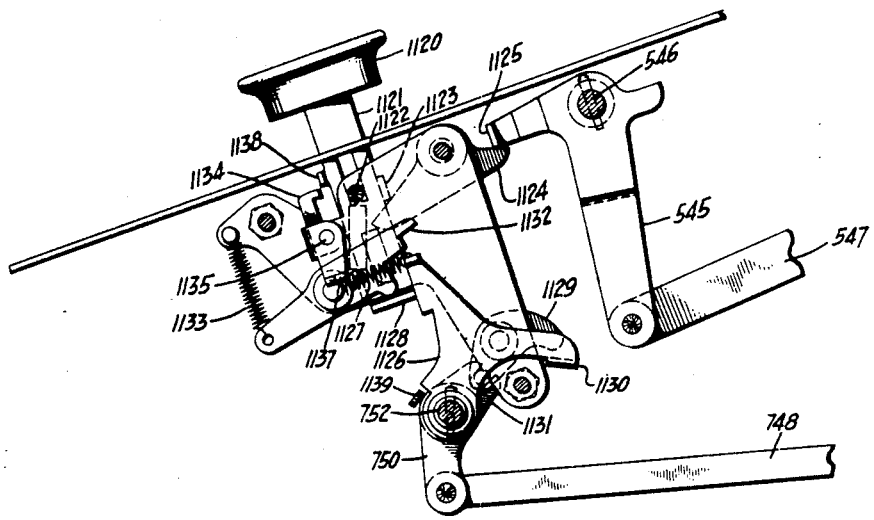
FIG_27.
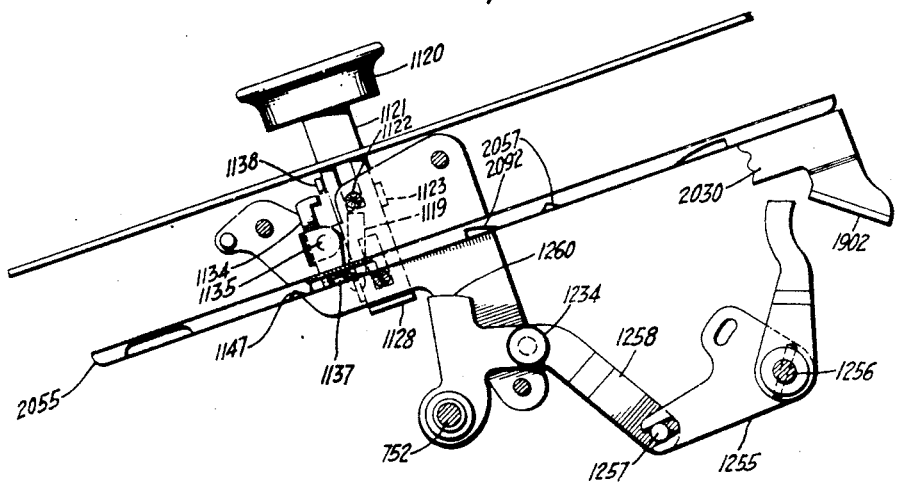
Inventor
HAROLD T. AVERY
By
Attorney Patented Dec. 8, 1942

2,304,329

UNITED STATES PATENT OFFICE 2,304,329

CALCULATING MACHINE

Harold T. Avery, Oakland, Calif., assignor to Marchant Calculating Machine Company, a corporation of California Original application June 12, 1936, Serial No. 84,927. Divided and this application August 4, 1940, Serial No. 351,375

3 Claims. (Cl. 235—62)

This invention relates to calculating machines and more particularly to a novel control mechanism for subtraction and negative multiplication operations.

A primary object of the invention is to facilitate control of negative multiplication operation in a calculating machine for effecting short-cutting, et cetera.

A further object of the invention is to automatically latch a depressed control key for the duration of the operation of mechanism controlled by the key and thereafter to disable the latching means until the return of the key to its normal position.

A further and more specific object is the provision of a novel key latching mechanism of general application.

The present application is a continuation-in-part of the copending Avery application, entitled "Calculating machines," filed September twenty-third, 1935, Serial Number 41,671, and since matured into Patent Number 2,253,748, issued on August 26th, 1941; and is a division of the copending Avery application entitled "Calculating machines," filed June twelfth, 1936, Serial Number 84,927, and since matured into Patent Number 2,271,240, issued on January 27, 1942. Reference is had to the latter of said patents for a disclosure of a complete calculating machine embodying the present invention and including mechanism not specifically described herein.

The machine in which the present invention is illustrated is of the rotary, continuous motion type wherein the registering mechanism is maintained constantly in mesh with its actuator throughout the period of operation of such actuator. However, the invention may also be applicable to other types of calculating machines and, furthermore, although particularly applicable to control of negative or short-cut multiplication control, certain details of the invention may be applied to the control of different mechanisms.

Referring to the accompanying drawings forming a part of this specification:

Figure 1 is a plan view of a machine embodying the present invention, showing the keyboard, carriage and several controls including the short-cut key.

Figure 2 is a section in side elevation illustrating the keyboard for selecting a value and a portion of the actuator mechanism.

Figure 3 is a section taken along the line 3—3 in Figure 2 showing the typical construction and mounting of a key.

Figure 4 is a sectional detail of a keyboard check dial.

Figure 6 is a sectional view through one of the selection plate assemblies.

Figure 7 is a side elevation of the reverse unit and its controlling mechanism.

Figures 8 and 9 are side elevations of portions of the mechanism for controlling operation of the setting clutch.

Figure 10 is a side elevation of portions of the mechanism for controlling operation of the main clutch.

Figures 11 and 12 are side elevations, partly in section, illustrating the carriage dipping mechanism and certain controls therefor.

Figure 13 illustrates details of the mechanism utilized to control release of the carriage from its dipped position.

Figure 14 is a detail view showing the restore clutch and mechanism for controlling this clutch.

Figure 15 is a section taken on a line 15—15 in Figure 14 illustrating the construction of the spring link.

Figure 16 is a schematic view showing the various units insofar as their relationship to the driving means therefor is concerned.

Figure 17 is a slide elevation illustrating the mechanism for determining single or plural cycle operation selectively.

Figure 18 is a vertical section of the multiplier unit illustrating the manner in which selection may be made of a multiplier value.

Figure 19 is a detail view of the selection segment illustrated in Figure 18.

Figure 20 is a section taken on line 20—20 of Figure 18.

Figure 21 is a vertical sectional view of the multiplier unit.

Figure 22 is a sectional detail showing mechanism for automatically controlling the termination of a multiplication operation.

Figure 23 is a section taken on the line 23—23 of Figure 22.

Figures 24A and 24B illustrate details of the construction of certain levers illustrated in Figure 21.

Figure 25 is a detail sectional view showing the stop key and the short-cut key mechanism embodying the present invention.

Figure 26 is a vertical section illustrating a short-cut key and its associated mechanism.

Figure 27 is a similar section of the short-cut key illustrating certain interlocking mechanism operable in connection therewith.

*Manually set selection mechanism*

Figure 5:
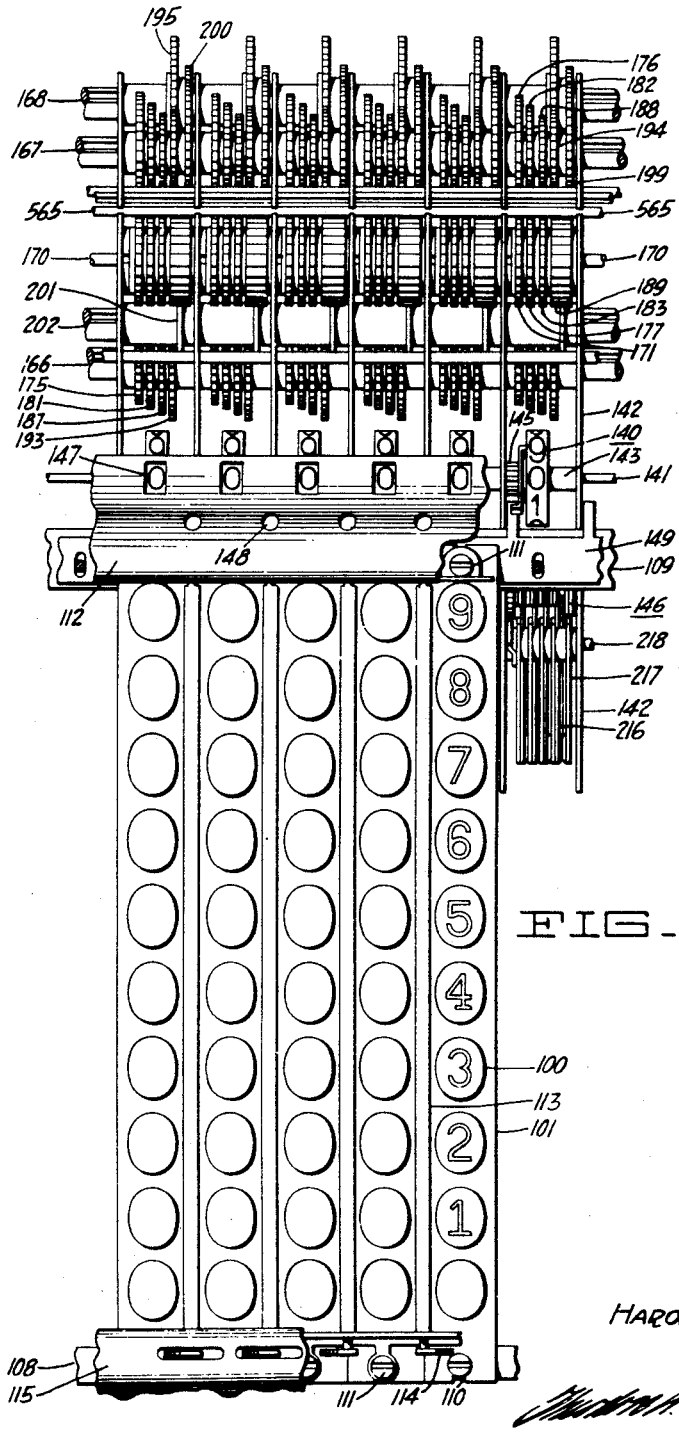
Figure 5 is a section taken generally along the line of 5—5 of Figure 2, illustrating the arrangement of the keyboard and the actuator mechanism.

The machine disclosed in the above identified Avery Patent 2,271,240 is of the key set type in which means are provided for first setting one factor of a calculation upon a keyboard or equivalent mechanism, and subsequently operating the machine in a manner determined according to the character and amount of another factor of the calculation.

The mechanism for setting up the first factor may be considered as comprising a manually operated and a power operated portion, the manually operated portion being designed to be moved to a selected controlling position by the depression of keys or the setting of equivalent mechanism, and the power operated portion being designed to be brought into operation immediately prior to the operation of the calculating mechanism and to act under the control of the manually set mechanism to move elements of the calculating mechanism to the proper position to cause operation thereof to enter the value set up on the keyboard.

In a machine designed for calculation in the decimal system, the keys are preferably arranged, as shown in Figure 1, in a series of banks of ten keys each, the number of banks provided in each machine depending upon the magnitude of the factors with which the machine is designed to deal.

As shown in Figures 2 and 3, each key section comprises the usual number of keys 100, which are slidably mounted in a channel-shaped key frame 101 and normally maintained in a raised position by suitable coil springs 102. The key stems 103 are assembled into the channel frame 101 (see Figure 2) by insertion from the top, the slot in the upper side of the channel member 101 being of sufficient width to pass the projection 104 of the key stem, but the registering slot in the lower side being of lesser width, preventing the key stem from dropping through and being also adapted to contact projection 104 to provide a limiting stop in operation of the mechanism.

After insertion of the key stems, strip 105 is secured in place by means of screws 106, thus blocking a portion of the upper slot and preventing withdrawal of the key stems. Strip 105 also carries a strip 107 of rubber or other resilient material against which projections 104 abut when the key stems 103 are pressed upward by their springs. This serves to diminish the noise ordinarily incident to the release of the keys from their latching means and their return to raised position.

Each key section is mounted in the machine between members 108 and 109 which extend between the side plates of the machine.

Disposed underneath the value keys "one" to "nine" inclusive, is a differentially settable bar 120 (Figure 2) which is pivotally suspended from the key section frame 101 by means of two parallel links 128 and 129. This bar 120 has nine identical notches 130, each of which has at its bottom a downwardly extending slot 131 adapted to receive the end of a key stem 103. The vertical center lines of the key stems 103 are spaced an equal distance apart. This distance, however, is slightly greater than the spacing between successive slots 131 so that each succeeding slot 131 will be spaced one increment further away from its cooperating key stem. This spacing is proportioned in such a way that depression of a value key will cam the bar 120 to the rear, a number of increments equal to the value represented by the depressed key.

Movement of each bar 120 is utilized to set up a mechanical representation of the selected value whereby the calculating mechanism may be accordingly controlled as hereinafter set forth. A swinging segment member 132 is mounted upon a common shaft 137 which supports like members associated with other key banks. This member is provided at opposite ends with arcuate racks 138 and 139, which serve to transmit the movement of the differential bar 120 respectively to a check dial assembly 140 positioned on shaft 141 in alignment with similar dials associated with the other key sections so that the value set up on the entire keyboard may be read on a straight line of dials, and to a cam unit 146, having a series of cams each comprising high and low points which are angularly displaced relative to the corresponding points on an adjacent cam. Cam unit 146 is thus positioned by such movement so as to form a mechanical representation of the number set up whereby the calculating mechanism may be controlled as set forth in the above identified Avery application, Serial No. 84,927. This cam unit 146 is driven through a gear 151 forming a portion of the unit (Figure 2), the gear being in mesh with rack 139 on segment 132. The segment 132 and the selection bar 120 are connected by means of a slot and pin connection 163 so that the segment is rocked directly about the shaft 137 upon depression of any key. Upon release of a depressed key, the return spring 164 (Figure 2) acts to return cam unit 146 associated therewith, and the check dial, to zero position.

After the setting of the mechanism heretofore described has been completed, and upon manipulation of one of the operating controls, the power operated portion of the selection mechanism is brought into operation prior to operation of the calculating mechanism, and acts, under control of the cam units 146, to move elements of the calculating mechanism to the proper position to condition it for effecting entry of the value set up on the keyboard into the accumulator.

This mechanism comprises three shafts 166, 167, and 168 (Figures 2 and 5), hereinafter referred to as the half, quarter, and twelfth speed shafts, respectively, which shafts are common to all orders of the machine. The shafts are connected to the prime mover through gearing and a cyclic clutch, hereinafter described, so that shaft 166 rotates through 180° for each cycle of operation of the machine, and shaft 167 rotates through 90° for each cycle of operation of the machine, while shaft 168 moves through 30° for each cycle of operation. A series of sleeves 169 (Figures 2 and 6), one for each decimal order, is freely mounted on a common pivot shaft 170 disposed between the shafts 166, 167, and 168, and each sleeve has keyed thereto several spaced gears for transmitting driving movement to the several orders of the registering mechanism, as hereinafter described.

Means are provided for selectively locking each of the several sleeves 169, or connecting each so that it will be driven by shaft 166, shaft 167, or shaft 168 at any of nine different rates with respect to the main clutch, said rates corresponding to the values delineated upon keys 100. Since this mechanism, which is duplicated in each decimal order of the machine, is fully described in the above identified Avery application, Patent 2,271,240, only a brief description of its operation will be necessary for an understanding of the present invention. Five selection plates 172, 178, 184, 190, and 196 (Figures 2 and 6) are pivotally suspended on sleeve 169 in each order and each has mounted thereon a pair of entrained gears as at 173 and 174, the latter meshing with a gear keyed to the sleeve 169. The gears 173 and 174 have different gear ratios on the different plates.

One of the five plates of each order is positioned during a selecting operation to select a value or zero, the remaining four plates of the order being held in idle position. The value positions are positions in which the plate-carried gears mesh with gears on shafts 166 or 167, while the intermediate positions are those in which no such connection is effected. Thus, by way of example, if a "six" is to be selected, plate 172 will be swung to the left in Figure 2, to engage its gear 173 with gear 175 on shaft 166, while all the other plates will be positioned in intermediate or idle positions.

This simultaneous setting of the selection plates is effected by power driven mechanism which senses the cam units 146 hereinbefore mentioned. This mechanism comprises a group of five feeler arms 210 (Figure 2), one for each of the five plates 172, 178, 184, 190, and 196, pivotally connected thereto by studs 206. Each arm is provided with a sensing nose 211 adapted to be pressed against the associated cam with which it is in radial alignment. These feeler arms 210 are pivotally supported on a common shaft 213 supported by links 214 pivoted on shaft 215 fixed to the frame of the machine, and each feeler arm 210 is connected by a link 216 with a second feeler arm 217 pivotally mounted on a fixed shaft 218 supported in the frame, and provided with a sensing nose 219 adapted to contact the same cam at a point approximately 180° removed from the point at which it is contacted by nose 211. This sensing system is actuated by a plurality of pairs of complementary cams 220 and 221 adapted to be driven by means hereinafter described, and cooperating with rollers 222 and 223 on a cam follower 224 pivoted to the frame at 225 and connected by links 226 with shaft 213.

In operation, as cam follower 224 is rocked by these cams, shaft 213 will be advanced toward shaft 218 and each set of sensing noses 211 and 219 will be moved toward the cam unit 146 with which it is in radial alignment. If a nose 211 meets a low point 161 of one of the cams, the opposite nose 219 will meet the opposite high point 160, thereby rocking the connected selection plate into its forward position, as viewed in Figure 2. If, on the other hand, a nose 211 meets a high point 160 of one of the cams, the opposite nose 219 will meet the opposite low point 161 and the selection plate to which arm 210 is attached will be moved into its rearward position, as viewed in Figure 2. If, in the third case, a nose 211 meets only an intermediate portion and does not engage either a high or a low point of a cam, the opposite nose 219 will do likewise, and the connected plate will be positively positioned in central or neutral position in which its idler will be out of mesh with the gears on both shafts 166 and 167.

To accurately position the cam unit 146 before this sensing operation, a pawl 230 (Figure 2) is mounted on shaft 218 and its lower end is urged by spring 231 against pin 232 on link 214. When link 214 is moved, the pawl is thus permitted to engage gear 151, aligning the unit 146 of which the gear forms a part, and holding it against possible displacement during sensing.

The five cams, composing each selection cam unit 146, have their respective high and low points so positioned around their peripheries, and are so offset with respect to each other that if one of the feelers 211 in each order meets either a high or a low point on one of the five cams, the other four feelers 211 in the same order will not meet either a high or a low point on their associated cams. Thus, in each sensing operation, only one of the five selection plates will be rocked either forwardly or rearwardly, the other four of said plates in that order being maintained in their intermediate, central, or neutral position. Thus, the gears carried by each sleeve 169 can be operatively meshed only by a single train with one of the gears carried on either shaft 166 or shaft 167, or else locked by pawl 201. By this means, any selection from "zero" to "nine" inclusive, is effected in each decimal order under the control of key 100.

Means are provided for locking the selection plates in the relationship above described, comprising a lock gate 236 (Figure 2) extending across all orders in the machine. The gate is pivoted to the frame of the machine at 237 and engages one of three notches 238 in each selection plate to hold said plate against movement in either direction. All the selection plates are engaged simultaneously, the gate being operated by the setting clutch mechanism hereinafter described after the selection plates have been positioned.

*Accumulator mechanism*

From the foregoing description of the selection mechanism, it is apparent that a number comprising a plurality of figures can be registered upon the several sleeves 169 by differentially driving the gears attached to these sleeves various proportionate distances. However, in order to perform any mathematical computation such as addition, subtraction, multiplication, or division, mechanism must be provided for advancing a superior registering element one extra increment whenever the next lower element has made a complete rotation. This process is known as "carrying the tens," in a machine operating according to the decimal system.

In the present machine this function is accomplished by accumulator or product registering mechanism having indicia bearing dials visible through openings 318 (Figure 1) and carried in a carriage 250 (Figures 1 and 2) shiftable into a plurality of different positions.

The accumulator register mechanism is set forth in detail in the above identified Avery applications and a brief description of the same and of the driving connections therefor will be sufficient for an understanding of the present invention.

The register mechanism comprises, in part, a shaft 262 (Figure 11) supported by the carriage 250, which shaft serves as a pivotal support for a plurality of plates 266, equi-spaced from each other, and all connected to a common bail 269 at their rear ends. Bail 269 is known as a "dipping bail" by means of which the entire body of plates 266 can be simultaneously oscillated about shaft 262 during a complete multiplication operation as hereinafter described, in which description the mechanism supported by the plates 266 is referred to as the "dipping carriage."

The various denominational units of the accumulator mechanism are supported by the plates 266, each unit forming an assembly between two of said plates. Each unit comprises a dial visible at 318 (Figure 1) and connected by differential mechanism to a corresponding gear 273 (Figures 2 and 11) and to the next lower order dial whereby both digitation and tens carry can be registered concurrently. Gear 273 is rotatably mounted on a shaft 270 supported by the plates 266 and meshes continuously with a gear 271 rotatably mounted on a shaft 272 also supported by the plates 266. As the "dipping carriage" is lowered as described hereinafter, the gears 271 are lowered into mesh with the corresponding gears 189 on sleeves 169 to enable digitational entry to be made into the register.

*General calculations drive*

Power for the various operations of the machine is supplied through a plurality of power transmission devices including a cyclically operable main clutch 428, a cyclically operable setting clutch 430, a restore clutch 700, and a shift unit. To drive these devices, a motor 640 (Figure 16) is mounted within the frame of the machine, and regulated by a suitable speed governing device. A flexible coupling 642 connects the motor drive shaft 643 to an overload release device, as, for example, adjustable slip clutch 644. A pinion 645, driven by the slip clutch, drives the main clutch 428 through a transmission system including gear 646 carrying gear 647 meshed with gear 362, which is in turn engaged with idler 650, which in turn engages and drives the gear 415 on the main clutch. The main clutch 428, when engaged results in selective directional driving of the half, quarter, and twelfth speed shafts (see also Figure 2) under the control of a reverse unit which engages either gear 459 or gear 457 with the power drive. Thus, as appears under the description of the reverse unit, gears 459 and 457 are selectively driven through the main reverse unit, to drive the half, quarter, and twelfth speed shafts in either of two directions.

The setting clutch gear 430' is driven by gear 648 on the same shaft with gear 362 in the main clutch train. Gear 362 also drives a gear 361 on shaft 649 upon which is positioned the restore clutch 700. The shaft 649 therefore rotates whenever the motor operates.

Operation of the setting clutch 430 (Figure 8) is under the control of the machine operator, particularly through the instrumentality of various operation control keys. The control of the clutch 430 is such that, immediately upon depression of one of said keys, the clutch is engaged, clutch dog 394 being raised to release the clutch, start the motor, and permit shaft 431 to be driven. Normally, however, the clutch dog 394, which is supported on shaft 501 and keyed thereto, is held in engagement with the clutch by spring 522.

To permit operation of the setting clutch by the add or subtract keys 800 and 865, respectively, an operating bar 503 (Figure 8) is provided which is adapted to be depressed by either of these keys in a manner set forth in detail in the above identified Avery application Serial Number 84,927. Bar 503 is supported by means of levers 504 and 505 pivoted to a frame plate 506 and 507, respectively, and to the bar at 508 and 509, respectively, and is normally held in raised position by spring 510, exerting tension on the lower end of lever 504.

So that lowering of the bar 503 may rock the clutch dog 394, a bell crank 512 is pivoted to the lever 505 at 513, and provided with a notched arm 514 which overlies a lateral extension 515 on clutch dog 394 when the bell crank is in the position in which it is normally held by a spring 516 tensioned between the other arm of the bell crank and bar 503.

To limit operation of the setting clutch to a single cycle, since this is all that is required to operate the mechanisms actuated by clutch 430, means are provided for returning the clutch dog 394 to cause disengagement of the clutch after half a revolution of the clutch and shaft 431, even though the control key initiating operation of the clutch 430 is held in depressed position. This includes devices for releasing the clutch dog 394 from hooked arm 514 so that the spring may move the clutch dog to effect disengagement of the clutch 430.

The mechanism for effecting this operation includes the reverse cams 550 and 551 (see also Figure 7) on the setting clutch shaft 431, and the rock plate 552 which is rocked by these cams. A crank 520 (Figure 9) is rockable on shaft 501 and is provided with a lateral projection 521 at its forward end adapted to engage the arm 514 and rock the bell crank 512 against the tension of spring 516 about pin 513 to release the lateral projection 515 of the clutch dog 394. The opposite end of the crank 521 is bifurcated to embrace a pin 536 on the rock plate 552.

Upon operation of clutch dog 394 by arm 514 or by arm 1959 as described hereinafter, the clutch 430 is immediately engaged and shaft 431 is rotated. Cams 550 and 551 thereupon rotate and rock the rock plate 552 which, through the pin 536 thereon and crank 520, effects release of the clutch dog 394 which, under the tension of spring 522, is moved to stop the clutch 430 and the shaft 431 upon completion of half a revolution.

The setting clutch operates the power set selection and locking system, and effects the dipping of the accumulator carriage. The main clutch, for driving the actuator, is also engaged by the setting clutch, the two clutches being interlocked so that another setting clutch operation can not be initiated during operation of the main clutch.

For these purposes, the setting clutch controls the operation of a shaft 431. Mounted on this shaft are a series of cams including dipping mechanism cams, selection setting cams, and main reverse cams, the setting clutch proper, the restore clutch conditioning cam, and the main clutch starting cam.

*Main reverse unit*

For reversing the direction of drive of the elements driven by the main clutch, particularly the direction of rotation of the half, quarter, and twelfth speed shafts, a selectively settable drive reversing unit is provided, the construction of which is described in detail in the above identified Avery Patent 2,271,240.

Subtraction operations are accomplished by reversing the direction of rotation of the half, quarter, and twelfth speed shafts. Means actuated by the setting clutch are therefore provided (Figure 7) which may condition the main drive for reverse operation automatically by operation of the setting clutch 430.

A pendular lever 545 is capable of being acted upon by various control means including the negative multiplication controlling key to cause actuation of the reverse unit and change its setting. The pendular lever 545 is hinged on shaft 546, and a reverse unit controlling bar 547 is pivotally connected thereto and supported adjacent its opposite end by a link 548 having a bifurcated end slidable about setting clutch dog shaft 501. The reverse unit control bar 547 has an upturned end 549 underlying the reverse unit control member 469 hinged on shaft 386, so that whenever shaft 431 is rotated by the setting clutch, and cams 550 and 551 rock plate 552, shelf 553 on said plate will engage and raise the reverse control bar 547 to bring the upper face of its upturned end 549 into contact with one or the other of lugs 554 and 555 (Figure 7) on the reverse unit control member 469.

The reverse unit control member 469 includes a portion 556 having a radial slot 557 therein through which shaft 558 extends to limit the swinging movement of the control unit when it is being set by movement of link 547. Spring 560, as shown in Figure 7, is normally effective to position lever 547 in its rearward position so that it will be raised by cams 550 and 551, upon rotation of the setting clutch 430 and shaft 431, to engage lug 555. The reverse clutch is thereupon conditioned by member 469 to drive the calculating mechanism in the adding direction.

If the pendular lever 545 is moved to draw reverse bar 547 forward, as by depression of the negative multiplication control key 1120 (Figures 1, 25, 26, and 27), the upturned end 549 of lever 547 is placed beneath cross-tie 554 so that, when the cams 550 and 551 are rotated, the reverse unit control member 468 conditions reverse unit to drive the calculating mechanism in the subtractive direction.

*Carriage dipping*

After selection has been made of the values to be entered into the machine, entry of the values into the accumulator is effected. As previously described, the accumulator is supported by a series of plates 266 (Figure 11) connected by a common bail 269 and pivotally mounted for dipping movement by shaft 262. After selection, plates 266 are rocked about shaft 262 to bring gear 271 in each order into contact with the corresponding intermediate gear 189 (Figures 5, 6, and 11) keyed to sleeve 169 together with gears 171, 177, and 183. This group of gears 171, 177, 183, and 189, being keyed to a common sleeve 169 in each order, are rotated as a body at a certain speed and for a certain distance according to the value selected, as has been described in detail in the above identified Avery Patent 2,271,240.

Meshing of intermediate gear 271 with gear 189 in each order, results, upon rotation of gears 189, in the selected value being placed in the accumulator. To secure dipping of the carriage at the correct cyclic time, means operated by the setting clutch are provided for dipping the carriage and thus permitting transfer of the value selected.

The means for dipping the carriage from that position in which it appears in Figures 2 and 11, to bring gears 271 into mesh with gears 189 and then elevate the carriage at completion of the calculation, comprise two vertical sliding links 566 (Figure 11) slidable over pins 567 on opposite sides of the machine. Each link is provided with rollers 568 engaging bail 269, the links being urged upwardly by springs 569. Links 566 are pivoted to cam followers 570 by eccentric studs 572 so as to provide for adjustment of the engagement of gears 271 and 189. Cam followers 570 carry rollers 573 in engagement with cams 574 on setting clutch line shaft 431 so that the links 566 are positively pulled down by the operation of the setting clutch.

Means are provided for latching the carriage in its lower position during engagement of gears 271 and 189. This means includes latch levers 575 (Figure 11) in the form of bell cranks pivoted at 576 and each having a nose 577 formed at the upper end thereof to engage the lower edge of lateral extensions 578 on cam follower levers 570. The latch levers 575 are urged to engage the extensions 578 by springs 579. When the carriage is dipped the extensions 578 ride over the nose 577 and are latched therebeneath thus retaining the carriage in its lowered position until the latch levers 575 are operated to release the carriage in a manner presently to be described.

Rocking of shaft 202 to release pawls 201 from gears 189 is accomplished in time with the dipping of the carriage so that release of the gears 189 is properly coordinated with the meshing of gears 271 with gears 189. Keyed to the shaft 202 on each side of the machine are depending levers 586 (Figure 12) slotted to receive pins 587, carried at the upper ends of rock levers 588. The levers 588 rock upon shaft 225 and are provided at their lower ends with rollers 589 for engagement by the cam 574.

When the setting clutch rotates the cam 574 to rock the cam follower levers 570, the pawls 201 are thus released except in those orders in which a zero has been set up, as has been previously explained. A detent mechanism which comprises a lever 532 pivoted on a shaft 533 and urged toward clockwise movement by a spring 534, cooperates with a nose 535 formed on the rocking lever 588 to retain it in either of the positions in which it is capable of being set, so that pawls 201 will not reengage gears 189 until the restore clutch operates, as hereinafter described.

Means are provided for releasing the dipping carriage latch lever 575 after the end of main clutch operation. These include (Figure 13) levers 580 and 584 secured to shaft 581, and cooperating with a lever 591, pivotally supported on shaft 590 and provided with an extension 592 lying against lever 584. A second extension of lever 591 is adapted to be engaged by a roller 593 fixed between a supporting disc 700A fixed to sleeve 594 rotatably mounted on shaft 595. This sleeve is driven by a separate clutch operated only as an incident to the termination of operations, and known as the "restore clutch."

When the main clutch dog 395 is moved to stop and release main clutch 428 (Figure 10), as will be described hereinafter, the restore clutch starts operation and roller 593 (Figure 13) is rotated. This rocks lever 591 clockwise to move lever 584 and so rocks levers 580 and 539 (Figure 11) to release the latched-down carriage through the rocking of the levers 575 by lateral extensions 583.

As a further incident to the movement of the shaft 581, roller 536 (see Figures 11 and 12) engages a cam surface 537 on the lower edge of the rocking levers 588 thereby rocking these levers to cause reengagement of the pawls 201 with the gears 189.

The sleeve 594 of the restore clutch 700 carries another cam 596 (Figure 11) which is employed to prevent the carriage from rising too rapidly. Lever 597, fixed to shaft 600, bears against this cam and lever 599 also fixed to shaft 600 is joined by a pin and slot connection 602 to one of the links 566 so that the rate of rise of the carriage under the pull of springs 569 is no greater than that permitted by movement of cam 596.

Main clutch operation

The main clutch is engaged and its operation initiated by the setting clutch. Thus, when any one of the operation control keys is depressed, and the setting clutch is started in operation, as has been previously described, the main clutch is automatically engaged, and may be held engaged for one or more cycles of operation, depending on the operation called for by the key depressed.

The main clutch structure has been described in detail in the above identified Avery Patent 2,271,240 and is similar to that of the setting clutch. The main clutch 428 is mounted on the shaft 429 which is positioned between frame plates 524 and 610 of the machine (Figure 16). The clutch is controlled by clutch dog 395 (Figure 10) rockably mounted on shaft 611 and urged into engagement with the main clutch by spring 612, tensioned between a frame stud and the left end of the dog through toggle linkage 610.

The rocking lever 746 is fulcrumed on shaft 501 and carries a roller 745 in engagement with the cam 747 carried by the setting clutch shaft 431. This rocking lever carries a member 603 pivoted thereon at 604 and urged to rock clockwise with respect to the rocking lever by spring 613, movement between the lever and member being limited by an ear 614 on the member 603 engaging the lower edge of the lever 746. The member 603 is provided with a nose 615 which may engage a notch 616 on clutch dog 395 with a hooking action to prevent disengagement of these two parts. The movement of member 603 counter-clockwise about shaft 501 serves to rock dog 395 toward the end of the half rotation of setting clutch shaft 431, the dog being rocked clockwise, and engagement of the main clutch 428 follows. Further rotation of cam 747 permits return of the rocking lever 746 to the position shown in Figure 10 and permits clutch dog 395 to contact with and stop the clutch when it is freed from the holding means, hereinafter described, which can selectively latch the dog 395 for a plurality of cycles.

Main clutch control

To provide for controlled continuous rotation of the cyclic main clutch for multiple cycle operation, as in multiplication, a latch 632 pinned to shaft 626 and urged clockwise by spring 633, has a notch at its upper end to engage under a lateral projection 620 on the tail of the main clutch dog 395. A roller 634 is carried by the latch 632 in a position to form the engaging face of the notch, thus facilitating engagement and disengagement of the clutch dog therewith. The clutch dog will be so latched out of engagement with the clutch only on multicyclic operation, but for operation performed in one cycle of the main clutch, such as multiplication with the number "1" as a multiplier, means hereinafter to be described will prevent the latch 632 from entering under the tail of the main clutch dog.

Restore clutch

The restore clutch 700 (Figure 14) is employed to effect the release of the carriage latch member 575 (Figure 11) and to control the rate of the return of the carriage from its dipped position, as well as certain functions hereinafter described in connection with multiplication. This clutch is jointly controlled by the dipping carriage and by the main clutch dog, in such a way that whenever the carriage is in its lower position and the main clutch dog 395 is seated home in the notch of the main clutch, the restore clutch will open and complete one cycle of operation.

The lowering of the carriage creates a spring bias tending to move the clutch release dog away from the restore clutch and permit engagement of the restore clutch, but as this dog is normally latched by member 701 (Figure 14), the spring is prevented from becoming effective until completion of the main clutch cycle. The raising of the carriage is initiated and controlled by the restore clutch and this carriage movement is utilized to reverse the spring bias on the restore clutch release dog so as to tend to return it home so that as the restore clutch cycle is finished, the clutch release dog is spring pressed into the full cycle notch of the clutch housing, bringing the restore clutch to rest upon the completion of one cycle of operation.

The clutch particularly employed is similar to that disclosed in the patent to Friden, Number 1,643,710. This clutch, which is mounted upon and driven by shaft 649 (Figure 14), is directly controlled by an extending nose 702 on a clutch release dog in the form of a bell crank 405 which is freely supported on a shaft 600. For controlling the clutch release dog, an M-shaped member 703 is provided which has one foot rockably mounted on the shaft 600, and a lug 704 thereon, supporting a spring 705 compressed between itself and the left arm of bell crank 405.

An arm 722 keyed to the shaft 600, and thus rocked by dipping movement of the carriage, is resiliently connected to the M-shaped member 703 by a link unit 723 shown in detail in Figure 15. As appears in this figure, the link structure includes a first link member 706 secured by a pin 709 to the arm 722, and another link 711 secured by pin 712 to the M-shaped member 703, the other ends of each link being slotted as at 713 to receive the pins 709 and 712, respectively. Each link has a cut out portion into which two tenons 714 and 715 extend, the respective tenons being of different lengths so that a column support is provided for the spring 716, slipped over the adjacent tenons in each link, so that when the unit is pulled apart, the spring is compressed. Likewise, when the overall length of the unit is reduced, the spring is also compressed so that the spring tends to maintain the link at a given and constant length while being continuously supported by the overlapping tenons.

As the setting clutch rotates, the main clutch dog 395 is withdrawn from contact with the main clutch and an extension 408 on said dog is withdrawn from beneath latch member 701 pivoted on a frame plate, thus permitting said latch member to be rocked counter-clockwise by its spring 717 tensioned between one end thereof and the frame. An ear 718 on said latch member is thereby brought into the notch 719 of the M-shaped member 703 to prevent counter-clockwise movement of 703 until the main clutch has been disengaged by reseating of its dog 395 in one of the full cycle notches of the clutch 428.

The lowering of the dipping carriage, however, tends to engage the restore clutch even before the main clutch engages, and a second restraining means is provided to prevent such operation.

The left foot of M-member 703 is provided with a shelf 720 overlying one end of a bell crank 721 which is rockably supported on shaft 611. The other end of bell crank 721 is provided with a roller 707 lying against the periphery of a cam 708 on the setting clutch shaft 431. On rotation of the setting clutch, therefore, the bell crank 721 is rocked and shelf 720 is raised by the end of the bell crank to rock the M-shaped member 703 slightly clockwise about the shaft 600. This raising of the member 706 insures that the lug 718 of the latch member 701 will engage in the notch 719 properly when the main clutch is engaged.

As the setting clutch continues to rotate, the dipping carriage is lowered and shaft 600 is rocked counter-clockwise by arms 599 (see also Figure 11) keyed thereto and connected with the carriage lowering links 566. Arm 722 (Figure 14) keyed to the shaft 600, is thus lowered, and since the M-shaped member 703 is held by the latch member 701, the link unit 723 is lengthened and its spring 716 compressed.

The parts remain so positioned until the main clutch dog 395 is permitted to reseat in the notches of the clutch discs, whereupon the extension 408 thereof strikes the ear 710 of the latch member 701, rocking it clockwise and removing its lug 718 from the notch 719 of member 703. Spring 716 is then permitted to expand, shortening the link unit 723 and rocking the member 703 counter-clockwise to carry the left leg (Figure 14) of member 703 down against the leftwardly extending arm of bell crank 405 and move the restore clutch dog 405 to cause engagement of the clutch.

Operation of the restore clutch thus initiated, causes the dipping carriage to rise, as previously described, rocking arm 722 clockwise by virtue of its connection therewith. Movement of the arm 722 is, in this operation, transmitted directly through the link unit 723 to rock member 703 clockwise, and to compress spring 705 until the nose 702 of the restore clutch dog 405 can re-enter the aperture of the housing to disengage the clutch, whereupon the mechanisms are brought to rest in the position shown in Figure 14.

*Automatic multiplier unit*

The present machine includes a bank of automatic multiplier keys 2001 which is shown in Figure 1 adjacent to the right hand side of the machine, and under control of which automatic positive and negative multiplications can be effected. This unit includes a key section 2002 (Figures 18 and 21) which is quite similar to that employed for setting a factor of a calculation, and disclosed in connection with Figure 2.

In the present machine, the key section 2002 is placed adjacent to the right hand side of the machine, as appears in Figure 1. However, the mechanism set thereby is placed adjacent the multiplicand keyboard and between the said keyboard and the plus and minus keys in Figure 1. The key section 2002 (Figure 18) includes the usual differentially settable bar 120 which is set by the multiplier keys of the "2" to the "9" values to move the selection segment member 132 mounted on shaft 137. The machine being normally conditioned for single cycle operation, no control of the multiplier selection by the "1" key is necessary. The member 132 is substantially like the same member disclosed in Figure 2, except that it does not have the upper segment arm there shown for setting a check dial.

The mechanism for swinging the member 132 is illustrated in Figures 18, 19, and 20. A lever 2003 is pivotally mounted on a shaft 2004 which extends to the left from the key section 2002. A pin 2005 connects the lower end of lever 2003 with differentially settable bar 120 and on its uper end lever 2003 is pivoted by an eccentrically adjustable pin 2006 to a lever arm 2007. This lever arm 2007, as appears in Figure 20, is integral with an arm 2063 welded to a bail member 2064 pivotally mounted on shaft 2004. One end of the bail member is extended to form another lever arm 2065 having a bifurcated end embracing pin 2008 mounted upon the multiplier selection segment 132. Thus the lever 2003 and the lever 2065 are in effect joined as a single lever to rock together about the common axis of the shaft 2004 so that movement of the bar 120 will impart proportional movement to the selection segment 132.

As has been disclosed in connection with the manually set selection mechanism, the swinging member 132 is likewise effective to rotate a selection cam unit 146 similar to that described hereinbefore.

The multiplier unit also includes sensing members 210 and 217 (Figure 18) which, in the same way as has been disclosed in connection with the earlier described power set selection mechanism, are effective to sense the setting of the present cam unit 146 and, when the selection gate 236 is released to position plates 172, 178, 184, and 190, cooperating with driven gears 2009 (Figures 16 and 18) driving idler 2010 which in turn drives gear 2011. The gears 2009 are keyed to sleeve 2012 supported by shaft 170, and the sleeve 2012 is in turn driven by the twelfth speed shaft 168 (Figure 22) through a gear train including gear 2025 on the twelfth speed shaft 168, idler gear 2026, and idler gear 2027, driving gear 2028 on the sleeve 2012. Since the twelfth speed shaft is rotated whenever the main clutch is open, gears 2011 (Figure 18) are driven thereby through idlers 2010 carried on the settable plates 172, 178, 184, and 190. As has been developed in connection with the previously described power set selection mechanism, any one of the group of plates may be selectively moved to engage the gear 2011 carried thereby with gears which, in this case, are carried by sleeves rotatably mounted on the half or quarter speed shafts. Movement of these gears is utilized to control the number of cycles of operation of the main clutch and thereby to effect a positive or negative multiplication in all operations wherein the multiplier value is two or more. As will presently appear, rotation of the driven sleeve is utilized to disengage the main clutch after the predetermined number of main clutch cycles has occurred.

The driven sleeve rotatably mounted upon the half speed shaft 166 (Figure 23) carries gears 2013, 2014, 2015, and 2016 connected thereto as a unit. The driven sleeve rotatably mounted upon the quarter speed shaft 167 carries gears 2017, 2018, and 2019 connected together as a unit. These gears are mounted upon the half and quarter speed shafts for the sake of convenience and are not connected thereto, the shafts providing merely a convenient support. Gear 2020 is also rotatably mounted upon the quarter speed shaft but is not connected to the sleeve carrying gears including 2017, 1018, and 2019. As typical of the gears which may be used, the gears 2013 to 2016, respectively, include gears having twelve, fourteen, sixteen, and eighteen teeth, while the gears 2017 to 2020, inclusive, include gears having twenty, sixteen, twelve, and twelve teeth, respectively. The ratio of these gears to the gears driving them is such that gears 2013 to 2019, inclusive, respectively provide selection ratios extending from a "nine" multiplier to a "three" multiplier, while the gear 2020, as will presently appear, provides in combination with other mechanism, the "two" selection.

Depending upon the selection which has been made, one of the plates is swung either to the right or to the left, as viewed in Figure 18, to engage one of the gears in the group 2013 to 2020, inclusive. The three other plates remain in that position shown in Figure 18 in which gears 2011 are not meshed with any gear in the group 2013 to 2020, inclusive.

A single cam member 2021 (Figures 22 and 23) is attached to the sleeve carrying gears 2013 to 2016, inclusive, and, as will presently appear, is adapted to rock a bell crank 2022 universally pivoted on the frame by means of a loose fitting pin and spring connection 2029 so as to open the main clutch and stop the machine as hereinafter described, after the cam member 2021 has made a single rotation in either a clockwise or a counter-clockwise direction. Thus, for example, gear 2014, which is that providing for seven main clutch actuations, and controls a positive or negative multiplication by the value "seven," makes one rotation while the main clutch is making seven rotations. Since member 2021 is connected to the unit which includes gear 2014, it will likewise make one rotation and at the end of this rotation is effective to rock the bell crank 2022.

A double cam member 2023 (Figures 22 and 23) is included in the same unit with gears 2017, 2018, and 2019, and is effective upon half a rotation in either clockwise or counter-clockwise direction, to rock the same bell crank 2022. Thus, for example, gear 2018 is effective to control the multiplication, either positive or negative by the value "four," the main clutch making four rotations. During the four main clutch rotations, gear 2018 and the member 2023 make but half a rotation, the direction depending upon positive or negative multiplication. At the end of this half rotation, the member 2023 is effective to rock the bell crank 2022. Gear 2020, providing for multiplication by the value "two," is connected to the triangular cam member 2024 adapted to cooperate with a roller 2077 on the upwardly extending arm of bell crank 2022. This member is adapted, when gear 2020 is being driven, to rock the bell crank 2022 during the second cycle of main clutch operation.

Depression of any value key from "1" to "9" inclusive in the multiplier unit, is effective to effect engagement of the setting clutch, and is also effective to initiate motor operation by closing a motor switch.

The multiplier key section also includes a bar 2030 (Figure 21) which is in a position to be engaged by the stem of any key of from "1" to "9" value inclusive, and is mounted for parallel movement by swinging levers 2044 pivotally connected to its opposite ends. A spring 2032 connected to an extension of the forward lever 2044, urges these levers clockwise, thus normally maintaining the bar 2030 in a raised position. The levers 2044 carry extensions 1900 between which extensions is pivoted a stabilizer link 1901. This stabilizer link swings with the bar 2030 to prevent any play in the pivotal connection thereof which might result in other than perfect parallel movement upon depression of the various multiplier keys which contact the bar 2030 at spaced points throughout its length.

In order to close the motor switch and initiate motor operation upon depression of a multiplier key, the bar 2030 is provided adjacent its right hand end with an underlying shelf 1902. The shelf 1902 is engageable upon downward movement of the bar 2030 with a lever 1903 which, when depressed by shelf 1902, closes a motor circuit in a manner described in detail in the above identified Avery application Serial Number 84,927, to energize the motor 640 (Figure 16).

The mechanism for opening the setting clutch upon depression of any multiplier key from "1" to "9" includes a link 2033 (Figures 21 and 24B) which is pivoted at its right hand end at 1908 to an ear of the bar 2030, and is supported adjacent its left hand end by a link 1907 depending from a lever 2034, included in a lever system which comprises lever 2034, lever 2035, and lever 2036. The levers 2034 and 2035, as shown in detail in Figure 24, are pivotally mounted upon a common pin 2037 supported by a depending portion of the key frame. The lever 2036 is pivoted at 1906 to the lever 2035. Levers 2034 and 2035 include, respectively, projections 2038 and 2039 between which a spring 2040 is compressed to urge the levers apart. Similarly, lever 2036 includes a projection 2041 while lever 2035 includes a projection 2042, between which projections spring 2043 is compressed. A lug 2045 on lever 2035 limits the movement of lever 2036 and a lug 2116 on lever 2035 limits the movement of lever 2034 with respect thereto. Lever 2035 includes an ear 2046 which lies beneath the bar 2030 and which is forced downwardly when the bar 2030 is depressed upon operation of a multiplier key. Depression of the "0" multiplier key also rocks lever 2035 downwardly by means of a lever 2090 which underlies the zero key stem, being pivoted at 2091, and carries a pin 2093 overlying the left end of lever 2035.

It is desired to cause engagement of the setting clutch upon complete depression of any "1" to "9" multiplier key, and to prevent the initiation of operation before depression of such a key has been fully completed. Therefore, the final trip-off of the setting clutch is placed under joint control of the bar 2030 and the key latching mechanism.

Setting clutch operation is initiated by lowering of the link 2033 (Figure 21) by means presently to be described. The link 2033 underlies an ear 2048 formed on an upwardly extending arm of a long lever 2047 pivoted at 1909 and urged to swing counter-clockwise about its pivot by a spring 1956. The lever 2047 has a rearwardly extending arm 1950 provided with a slot 1951 embracing a pin carried by a floating interponent 1952 which is supported at one end by arm 1953 freely pivoted on a stud 1954 on the control plate, an ear 1955 being provided on the arm 1953 to abut the top edge of the control plate to limit the clockwise swinging movement of the link.

When the link 2033 is lowered, it permits the lever 2047 to be swung counter-clockwise by its spring 1956, raising the interponent 1952 to a position where it may be engaged by a ratchet wheel 1957 secured to a shaft which is rotated by a gear 362 (Figures 16 and 21) whenever the motor 640 is in operation.

The ratchet 1957 will thereupon kick the interponent 1952 sharply to the left so that its opposite end strikes a stud 1958 on a lever 1959. The lever 1959 (as also shown in Figure 8) is keyed to shaft 501 with the setting clutch dog 394 and secured relative to the dog so that such rocking movement of this lever will free the dog from the clutch.

The opposite ends of link 2033 are lowered by different means; but, as will presently appear, the leverages are so arranged that the lowering of either end alone will not permit the lever 2047 to rock counter-clockwise sufficiently to operate the setting clutch dog through the means described.

As a multiplier key of any value from "1" to "9" is depressed, the underlying parallel bar 2039 (Figure 21) is depressed lowering the right end of link 2033 which is connected thereto at 1908. The lever 2033, having ear 2046 (see also Figure 24) underlying bar 2033, is also rocked by this movement and compresses spring 2040, rocking lever 2034 slightly, and causing the lug 2062 engaging notch 2092 in the latch bar, to move the latch bar 2055 to the left until it abuts the lug 2015 of the moving key, arresting further movement of lever 2034 and causing spring 2040 to be further compressed. This movement is sufficient to carry notch 2057 out of the path of lug 2061. As the lug 2015 of the key is moved below latch bar 2055, spring 2040 is permitted to expand rocking lever 2034 to simultaneously bring the latch bar over the lug 2015 and lower the left end of link 2033 which is connected thereto by link 1907. Both ends of the link 2035 being now lowered, lever 2047 may be rocked sufficiently by its spring 1956 to cause engagement of the setting clutch. The latch bar 2055 holds the depressed key down and all other keys up until it is retracted.

In order to effect the release of the locked multiplier keys it is necessary to provide means which will be operated upon operation of either the setting clutch shaft 431 or the carriage shifting mechanism to retract the latch bar 2055. In view of the fact that the operator may depress a second key before the machine has completed the operation initiated by the first key depressed, and may be pressing down upon a third key before the second is released, special adaptation of the latch bar operating means to the peculiar requirements of such operation is necessary.

Retraction of the bar 2055 to unlock the keys is effected by a lever 2058 (Figure 21) pivotally mounted at 2059 and adapted to receive a clockwise oscillation upon operation of either the setting clutch line or the carriage shifting mechanism. As the setting clutch shaft 431 (Figure 10) receives a half rotation at the commencement of a multiplication operation, cam 747 fixed thereon rocks the cam follower lever 746 journaled for rocking movement on shaft 501 by means of a sleeve 2094 to which there is also fixed an arm 2060 (see also Figure 21) adapted, upon such movement to engage an ear 2072 on the lever 2058. During each carriage shifting operation, as will hereinafter appear, lever 1396 (Figure 21) receives a counter-clockwise oscillation, and this lever is provided with an arm 1394 adapted to engage a second ear 1399 on lever 2058.

Adjacent the upper end of lever 2058 there is pivoted thereto, an extension 2054 having a laterally formed portion engaging in a notch in latch bar 2055. A stiff spring 2058b compressed between the lever 2058 and its extension 2054 normally holds the extension against a stop 2058a formed on the lever, so that the lever and its extension ordinarily function as a unit. However, if lever 2058 receives an excessive stroke, the forward ends of the slots in latch bar 2055 will be brought against the key stems and spring 2058b will then yield. Spring 1960 normally urges lever 2058 clockwise and prevents latch bar 2055 from drifting into locking position.

Means are also provided to prevent relocking of a key in depressed position in the event it is held down until after the releasing mechanism described above has functioned. Lever 2036 (Figures 21 and 29) pivoted to lever 2035 at 1906 is provided with an ear 2061 adapted to engage in a notch 2057 in bar 2055 as the latter is moved to the right by lever 2058, and to restrain the bar from returning to key locking position so long as the key is held depressed. It will be recalled that lever 2035 is rocked counter-clockwise about its pivot 2037 by downward movement of the parallel bar 2030, and this movement thereof is transmitted through spring 2043 to lever 2036.

It will be observed that should the operator be pressing down upon a locked up multiplier key, it would depress during the instant when notch 2057 is being moved the slight extra distance to the right which is necessary to insure engagement thereof by ear 2061, and nothing heretofore described would prevent ear 2061 from engaging in notch 2057 so as to prevent the proper functioning of bar 2055, which is to lock the subsequently operated key in depressed position. To prevent such misfunctioning there is provided, a pawl 2069 (Figure 21) pivoted on a depending portion of the parallel bar 2030 and pressed against a limit stop provided by impingement of the tail of the pawl against pivot head 1908, by a spring 2070 compressed between the pawl and the parallel bar.

Pawl 2069 moves slightly upwardly and then downwardly with the parallel bar 2030 in such an operation as postulated above, and engages an ear 2078 on lever 2036 to rock said lever about its pivot on lever 2035, compressing spring 2043 and preventing engagement of ear 2061 in notch 2057. The key lock bar 2055 is therefore free to move leftwardly to lock the key in depressed position.

Obviously the pawl 2069 must release lever 2036 before the next oscillation of key release lever 2058; however, in order to insure against relocking of the same key in the event it is being held down by the operator. This releasing action is effected by a lever 2079 (Figure 21) rockably mounted on shaft 1152 and provided adjacent its upper end with a pin 2095 adapted to engage the edges of a pointed extension 2096 on pawl 2069 to rock said pawl and release lever 2036 therefrom.

Lever 2079 is operated by the carriage dipping mechanism through a link indicated by the dot-dash lines 2097 pivoted to the lower arm of lever 2079 and connected to link 1713 through a supporting link 2098 pivotally mounted in the frame. Referring to Figure 11, it will be seen that said link 1713 is pivoted at 598 to arm 1714 keyed to shaft 600 to which there is likewise keyed a bifurcated arm 599 embracing pin 602 on the carriage dipping links 566 operated by cams 574.

Cams 574 effect a release of lever 2036 from pawl 2069 before the retraction of lock bar 2055, which it will be recalled is effected by cam 747 (Figure 10), and the ear 2061 of lever 2036 will therefore be freed to restrain a return of the lock bar during a setting clutch operation initiated by depression of a key the release of which it is desired to insure. Where a key is being pressed down by the operator during a setting clutch cycle initiated by another key, it is not freed to go down until after the rocking of pawl release lever 2079 by the carriage dip cams and slightly before the completion of the retraction of the lock bar 2055 by the main clutch opening cam. Lever 2036 therefore will be restrained by pawl 2069 so that lock bar 2055 may move to the left and lock the key in depressed position and after bar 2055 has been moved to the right it will be held there by ear 2061 until the parallel bar carrying pawl 2069 is permitted to rise.

In order to accelerate upward movement of the multiplier keys without adding to the difficulty of depressing them, an additional force is temporarily applied to them at the time of their release by the locking bar. Pivoted on cam follower 721 (Figure 14) at 2088 is a member 2086 (see also Figure 21). Spring 2089, tensioned between the said member and the cam follower, normally holds the former against shaft 611 as an end stop, but rocking movement imparted to the assembly by cam 708 carries the end of member 2086 down upon a pin 2087 fixed to lever 1900 supporting the parallel bar underlying the multiplier keys. Member 2086 may thus be lifted clear of shaft 611 and spring 2089 extended by cam 708 to urge the depressed multiplier key upwardly.

The latch bar returning mechanism above described is able to overcome spring 2040 and rock lever 2035 to raise the left end of link 2033 so that the setting clutch cannot be engaged a second time by the key held down.

When a multiplier key above the "1" key is depressed, the V-slot bar 120 (Figures 17 and 18) moves toward the right with the result that lever 2050 which hangs from shaft 2004 and is spring urged to the left, is rocked by lever 2003 engaging its projection 2052. This removes ear 2053 from over the upturned end of the lever 2051 so as to permit spring 633 (Figure 10) to rock lever 632 and its roller 634 to latch the main clutch dog 395 until its release by the trip-off devices hereinafter described. The lever 2051 normally prevents latching of the main clutch dog through its contact with ear 2049 on the tail of latch 632.

To prevent lever 2050 from being displaced by depression of a higher multiplier key after the "1" key has been depressed, a blocking lever 2110 (Figure 17) is urged upwardly by spring 2111. The blocking lever 2110 is normally held down (as shown in Figure 17) by an ear 2112 on a bell crank 2113 pivoted at 2114 to the lever 2051. The lug 620 on the main clutch dog 395 (see also Figure 10) engages the bell crank 2113 when the main clutch is not in operation. When the main clutch dog is released, the lug 620 thereon moves upwardly permitting spring 2111 to swing the blocking lever 2110 into its blocking position behind the ear 2053 on the lever 2050. Lever 2051 is urged in a clockwise direction by a spring identical to the spring 2111 and disposed directly behind the spring 2111 (as viewed in Figure 17).

To stop the machine after a predetermined number of multi-cyclic operations have occurred, cams 2021, 2023, and 2024, and bell crank 2022, as described hereinbefore, are employed. As appears in Figure 22, the right hand face of cam 2021 has a lateral cam face at 2070, so that at the beginning of a clockwise or counter-clockwise rotation of cam 2021 the tip 2071 of the universally pivoted bell crank 2022 is moved aside and rides along the outside face of the cam until the high point thereof has been passed, when the bell crank end is moved back into cooperative relation with the peripheral face of the cam by spring 2122 which includes a pin 2123 therein to act as a guide for the spring and to centralize lever 2022. As the cam approaches the end of its rotation, the bell crank is rocked in a counter-clockwise direction. This rocks lever 2072 clockwise about its pivot which, in turn, rocks lever 2117 counter-clockwise. Lever 2117 is pinned to shaft 626 which, as appears in Figure 10, is the same shaft to which the main clutch dog latching lever 632 is pinned; thus, this counter-clockwise movement of lever 2117 also rocks the lever 632 in a counter-clockwise direction to release the main clutch dog.

The inside face of cam 2023 (Figure 22) is provided with similar cam faces, as appears at 2076, so that a roller 2077 on bell crank 2022 first rides about the outside face of that cam and then onto the peripheral surface of the cam to ride over the high point thereof, irrespective of whether the cam is rotating in a clockwise or a counter-clockwise direction. When a "2" selection is made, and cam 2024 is rotated by gear 2020, the cam follower 2022 follows the periphery of the triangular-shaped cam 2024, under the pull of spring 2122, and rocks levers 2072, 2117, and shaft 626 upon riding over the high point of the cam 2024. Either of these operations releases the main clutch dog latch and stops the machine, as hereinbefore described.

Back-lash in the gear train driving gear 2024 ordinarily insures such trip-off during the second cycle, but a lost-motion keyed connection between cam 2024 and its gear 2020 as shown at 2024a, is preferably provided.

To prevent rotation of gears 2017, 2018, and 2019, when a selection is made on any one of gears 2013, 2014, 2015, 2016, or 2020, a pawl 2080 (Figure 18) is provided which is held by spring 2081 in engagement with one of the gears in the group of 2017 to 2019, inclusive. A similar pawl is provided in connection with gear 2020 so that when a selection is made with any one of the gears of the groups 2013 to 2016, inclusive, or 2017 to 2019, inclusive, gear 2020 is held.

Another pawl 2083 (Figure 18 is associated with the group of gears 2013 to 2016, inclusive, through a notched cam 2082 which cam is keyed to the sleeve which supports said gears. A spring 2084 normally urges this pawl downwardly so that it will be received by a notch in the cam 2082 to hold the gears 2013 to 2016, inclusive, in a centralized position when they come to rest. A pawl 201, loosely keyed on shaft 202, cooperates with gear 2009 in the same manner as the other pawls 201 cooperate with gears 189, as has been described in connection with Figure 2.

*Negative multiplication control*

Negative or short-cut multiplication is under control of a key 1120 (Figures 1, 25, 26, and 27) positoned just to the left of the multiplier keys 2001 (Figure 1). This key is employed to effect negative multiplication operations and thus make possible a reduction of the machine operations necessary to perform multiplication where the multiplier contains numbers greater than "5." For example, a multiplier such as "48" normally requires depression of the "4" key and the "8" key with twelve ensuing main clutch cycles to complete the operation. To "short-cut" this multiplier, the operator may depress the "5" key to effect multiplication by "50" and then depress the short-cut key and the "2" multiplier key, obtaining the same product with but seven main clutch cycles.

The short-cut key 1120 has a slotted key stem 1121 guided for vertical movement by pins 1122 and normally maintained in raised position by a spring 1119. An ear 1123 on the short-cut key stem engages a lever 1124 (Figure 26) to rock the same counter-clockwise upon depression of the key and thus impart clockwise rocking movement to the pendular lever 545 by raising an ear 1125 formed on an extension thereof. This lever 545, as previously described and as shown in Figure 7, conditions the main reverse unit for negative operation when rocked in this manner.

The short-cut key 1120, when depressed, will be latched down by a pawl 1126 which is urged in a counter-clockwise direction by spring 1127 tensioned between the upper end thereof and a frame stud, to engage a shelf 1128 formed at the lower end of the key stem. Clockwise rocking of pawl 1126 to permit return of the short-cut key to raised position at the end of the setting clutch cycle is effected by means of a lever 1129 (Figure 26) which is rocked against an ear 1130 on the tail of the pawl 1126, the lever 1129 being actuated, through a pin and slot connection, by a lever 1131 pinned to a shaft 752 to which a lever 750 is also pinned. The shaft 752 is rocked by the lever 750 through a link 748 which operates from the setting clutch line as appears in Figure 10.

In the event that the operator is holding down the short-cut key 1120 when the unlatching of the key from pawl 1126 takes place, a blocking lever or latch 1132 will be moved in front of the upper end of the pawl 1126 by a spring 1133 to retain the pawl in its ineffective position. This insures return of the short-cut key whenever the operator removes his finger from the same and during such return the shelf 1128 at the lower end of the key stem 1121 engages and moves the blocking lever 1132 counter-clockwise permitting the pawl 1126 to resume the position wherein it will again latch the short-cut key the next time that it is depressed.

A blocking lever is provided to prevent depression of the short-cut key while a multiplier key is depressed and likewise to prevent latching down of a multiplier key and starting of the machine if the short-cut key is only partially depressed. This blocking lever 1134 (see Figures 26 and 27) pivots about a pin 1135 and has an ear 1137 at its lower end engaging a notch in the multiplier key latch bar 2055. Upon depression of a multiplier key the latch bar travels to the left and swings the blocking lever 1134 so that its hook-shaped upper end underlies an ear 1138 formed on the edge of the short-cut key stem, thus preventing depression of the short-cut key. The multiplier keys are rendered ineffective by partial depression of the short-cut key, because the ear 1138 then lies in the path of the head of the blocking lever 1134, and thus prevents leftward movement of the multiplier key latch bar 2055 which must occur upon depression of the multiplier key before operation of the machine can be initiated. When the short-cut key is fully depressed, the ear 1138 lies below and out of blocking position with respect to the head of the blocking lever 1134, but the blocking lever does not prevent the key from rising when its latch 1126 is released, because the blocking lever is moved to ineffective position when the multiplier key latch bar is moved to the right early in the setting clutch cycle.

When the short-cut key is depressed, it is latched down as has just been described, until near the end of the setting clutch cycle. In the event that the short-cut key should be depressed inadvertently, it would be obviously undesirable to require a setting clutch operation to effect its release. Therefore, release of the short-cut key under such conditions is placed under control of a key 985 (Figure 25) which upon depression is effective through levers 1075 and 1076 to move a lug 1139 to engage and rock the pawl 1126, releasing the short-cut key from its depressed position. A tension spring 1078 connected to an arm 1077 secured to the lever 1076 returns key 985 to normal illustrated position upon release of key 985 by the operator.

*Operation of carriage shift mechanism*

Means are included in the machine in connection with which the present invention is disclosed for automatically shifting the carriage 250 from one position to the next after an automatic multiplication operation in each order.

The construction and operation of this carriage shifting mechanism has been described in detail in the above identified Avery Patent 2,271,240 and, since the operation thereof is incidental to the present invention, only a brief description thereof will be sufficient for an understanding of the present invention.

As the carriage is dipped at the start of an automatic multiplication operation in a particular order, a lug 1386 (Figure 11) on one of the cam follower levers 570 is moved to the right and a shift operating lever indicated by the dot and dash lines 1377 is spring pressed upwardly into latching engagement with the lug, a projection 1385 on lever 1377 moving up in front of the lug. At the completion of the multiplication operation the carriage is permitted to rise and the lug 1386, moved forward by counterclockwise rocking of lever 570, forces the shift operating lever 1377 to also move forward, thereby instituting a one step shift of the carriage, the direction of which may be controlled by depressing one or the other of the carriage shift direction controlling keys 1201 and 1202 (Figure 1).

As the carriage is being shifted a lever 1391, shown partly in Figure 21, is moved to the left by the carriage shifting mechanism (not shown) to rock the lever 1396 counter-clockwise and thereby, through engagement with lug 1399 on lever 2058, effect an unlatching movement of the latch bar 2055 as described hereinbefore.

Counterclockwise rocking of lever 1396 also causes an ear 1149 thereon to move a link 1150 to the left. This link is connected at its left end to a bell crank 1151 pivoted on shaft 1152, which bell crank is thus rocked to bring an ear 1154 thereon to a position directly beneath the extreme forward end 2000 of lever 2047, thereby preventing counter-clockwise movement of said lever to bring the interponent 1952 into cooperative relation with the ratchet 1957 to initiate setting clutch operation. As the carriage nears the end of its shift, the lever 1391 is retracted toward the right, allowing subsequent rocking of the lever 2047 by depression of one of the multiplier keys 2001 to initiate multiplication operation in the new carriage position.

I claim:

1. In a calculating machine having registering mechanism, actuating mechanism therefor, and settable means for determining the sign character of amounts entered into said registering mechanism by said actuating mechanism; the combination with means for initiating operation of said actuating mechanism including a depressible key and means for latching said key in depressed position, of a separate settable key, means controlled by said settable key for setting said settable means, and means controlled by said settable key and effective upon a partial setting movement thereof for preventing operation of said means for latching said depressible key in depressed position.

2. In a calculating machine having registering mechanism, actuating mechanism therefor, and settable means for determining the sign character of amounts entered into said registering mechanism by said actuating mechanism; the combination with means for initiating operation of said actuating mechanism including a depressible key and a yieldable operation initiating device operable by said key; said device being normally effective, without yielding, to initiate operation of said actuating mechanism; of a separate settable key, means controlled by said settable key for setting said settable means, and normally ineffective means controlled by said settable key and effective only upon a partial setting movement thereof for causing said operation initiating device to yield upon depression of said depressible key; whereby initiation of the operation of said actuating mechanism is suspended when said settable key occupies a partially set position.

3. In a calculating machine having registering mechanism, actuating mechanism therefor, and settable means for determining the sign character of amounts entered into said registering mechanism by said actuating mechanism; the combination with multiplication control means including a depressible key, of a separate settable key, means controlled by said settable key for setting said settable means, means for latching said depressible key in depressed position, means responsive to said latching means upon operation thereof for initiating operation of said actuating mechanism, and means controlled by said settable key and effective upon a partial setting movement thereof for inhibiting operation of said latching means and thereby preventing initiation of operation of said actuating mechanism in response to operation of said depressible key.

HAROLD T. AVERY